Aug. 4, 1970     H. N. SEIGER     3,522,507

RECHARGEABLE BATTERY AND CHARGE CONTROL CIRCUIT THEREFOR

Filed April 28, 1966     4 Sheets-Sheet 1

INVENTOR
HARVEY N. SEIGER by: Wallenstein, Spangenberg, Hattis &
Strampel
ATTYS.

INVENTOR
HARVEY N. SEIGER

INVENTOR
HARVEY N. SEIGER

United States Patent Office 3,522,507
Patented Aug. 4, 1970

---

3,522,507
RECHARGEABLE BATTERY AND CHARGE CONTROL CIRCUIT THEREFOR
Harvey N. Seiger, East Brunswick, N.J., assignor to Gulton Industries, Inc., Metuchen, N.J., a corporation of New Jersey
Continuation-in-part of applications Ser. No. 343,771, Feb. 10, 1964, and Ser. No. 424,913, Jan. 12, 1965. This application Apr. 28, 1966, Ser. No. 545,924
Int. Cl. H02j 7/00
U.S. Cl. 320—31     4 Claims

ABSTRACT OF THE DISCLOSURE

A three electrode battery with the third electrode being of the oxygen consuming type. When the battery becomes charged, the third electrode absorbs the evolved oxygen until a voltage is caused to develop between the negative and control electrodes. The resulting current energizes a relay which opens the charging circuit.

---

This invention is a continuation-in-part of my copending applications Ser. No. 424,913, filed Jan. 12, 1965 now Pat. No. 3,350,225 and Ser. No. 343,771 filed Feb. 10, 1964 now abandoned.

The present invention relates to rechargeable sealed secondary batteries and has its most important application with alkaline nickel-cadmium and silver-cadmium batteries. The present invention has application in those rechargeable sealed batteries where oxygen is generated at the positive plates during the charging of the batteries at a rate where it cannot be consumed within the battery in sufficient amounts to prevent the build-up of dangerous pressures within the battery without termination of the battery charging operation involved.

In sealed rechargeable batteries of the type which generate oxygen during the overchanging thereof, the use of a relatively low charging current is usually recommended because oxygen is produced at a very slow rate at low charge rates and the small amount of oxygen then generated is readily consumed at the negative battery plates. However, at low charge rates the charging time of batteries is frequently inconveniently long, taking as much as from 8 to 12 hours. The substantial reduction of the charge time by using abnormally high charge rates has not been heretofore achieved with conventional battery constructions because the negative battery plates cannot consume the generated oxygen fast enough to prevent the dangerous build-up of pressure within the batteries involved.

It has, heretofore, been proposed to incorporate special oxygen consuming electrodes in sealed rechargeable batteries where they can consume substantially all of the oxygen generated during the high rate charging of the batteries. Before my invention disclosed in said applications Ser. Nos. 424,913 and 343,711, oxygen consuming electrodes were practiced for this purpose on wet cell batteries where the oxygen consuming electrodes were spaced substantially above the plates. Dry cell batteries, however, posed especially difficult problems in successfully applying oxygen consuming electrodes thereto partly because of the difficulty of maintaining a thin layer of electrolyte thereon. The aforesaid application Ser. No. 424,913 discloses dry cell battery construction with oxygen consuming electrodes with exceptionally good oxygen consuming qualities per cubic inch of displacement thereof, so that they can be applied to even relatively small dry cell batteries without requiring any increase in the overall size of the batteries and in a manner where the oxygen consuming electrodes do not age or dry-out as in the case of the oxygen consuming electrodes previously applied to dry cell batteries.

The oxygen consuming ability of oxygen consuming electrodes decreases with decrease in temperature. Where the physical and/or electro-chemical conditions thereof fall substantially below room temperature, the oxygen consuming ability of the oxygen consuming electrodes deteriorate so much that the volume of electrode material needed to absorb all of the generated oxygen at high charge rates may become prohibitive. Also, where the battery is overcharged, electrical energy is all converted into thermal energy. This causes the battery to heat up. The degree of heating depends upon two factors, one being the charge rate and the other being the ability of the battery to dissipate the heat which is determined at least in part, by the battery surface to volume ratio. Spiral and button cell rechargeable batteries used for small consumer articles, such as flashlights, photographic flash-guns, radios, cigarette lighters, etc. have such a large plate surface area to volume ratio that they can easily radiate the heat generated at high charge rates, so that such batteries generally operate at or near room temperature. However, the much larger high capacity prismatic type batteries often heat up to temperatures well above room temperature and, when overcharged at high current levels could readily heat up to excessive temperatures which could damage or destroy the batteries.

The present invention provides a unique combination of a sealed rechargeable battery which can operate substantially above room temperatures and a unique battery charge circuit which responds to the flow of current to oxygen consuming electrodes therein indicating a fully charged condition of the battery by terminating the charge of the battery.

Oxygen consuming electrodes used in sealed rechargeable batteries are generally connected to the negative battery plates and the process of oxygen consumption at the oxygen consuming electrodes results in current flow between the negative battery plates and the oxygen consuming electrodes. It was previously thought that appreciable oxygen generation at the positive plates of such batteries starts only as the battery reaches a fully charged condition. It was heretofore proposed to place a relay coil in the circuit between the negative battery plates and the oxygen consuming electrodes of a battery where the relay coil operates contacts which control the connection of the charging current source to the battery. When appreciable oxygen was generated, the resulting current flow through the relay coil opened the contacts to disconnect the charging current source from the battery before the battery was fully charged. However, I have found that appreciable oxygen generation takes place well ahead of the fully charged condition of the battery. Thus, to effectively fully charge a battery by the detection of the current flow between the negative battery plates and the oxygen consuming electrodes, the magnitude of current flow involved should vary progressively with the oxygen pressure in the battery, and the level of current at which the charging current source is disconnected, to be referred to as a trip level, is set to correspond to a point indicating the actual full or near fully charged condition of the battery involved.

Moreover, the fully charged condition of a battery was believed to be the condition where all of the active material in the positive plates of the battery, nickelous hydroxide in nickel-cadmium batteries, is oxidized to beta nickel hydroxide. However, I have found that the amount of available nickelous hydroxide in the positive plates which can be oxidized varies with the charge rate, so that charge efficiency increases with the charge rates. Thus, for a given charge rate, there will be a given value of current flowing between the negative battery plates and the oxygen consuming electrodes which indicates a substantially fully charged condition of the battery. Thus, the most effective application of the charging current disconnect method of avoiding excessive build-up of pressure in sealed rechargeable batteries requires sensitive oxygen consuming electrodes which provide current flow between the negative battery plates and the oxygen consuming electrodes during oxygen consumption which is directly related to the amount of unconsumed oxygen in the battery. The electrodes disclosed in my application Ser. No. 424,913 satisfy this requirement even under the severe conditions of a dry cell battery.

Oxygen generation at the positive plates of a nickel-cadmium alkaline battery is primarily due to the following reaction which takes place during charging of the battery:

(1) Positive plates: 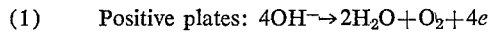 $4OH^- \rightarrow 2H_2O + O_2 + 4e$

It would seem, therefore, that upon interruption of the charge to the battery involved, oxygen generation ceases. My tests, however, have unexpectedly shown that, upon termination of the charging of the battery appreciable oxygen generation continues for a while, resulting in the continued increase in oxygen pressure and current flow between the negative battery plates and the oxygen consuming electrodes which rises to a value substantially in excess of the aforesaid trip level.

It is believed that this continued oxygen generation is due to the presence of unstable oxides within the battery wherein after a period following the discontinuance of a battery charge operation, significant oxygen generation from the unstable oxides ceases. For many applications this short lived oxygen generation after termination of a battery charging operation causes serious problems in the proper operation of the battery charge system because the battery cannot recharge until the current flowing between the negative battery plates and the oxygen consuming electrodes decays to a point below the trip level. This requires a relatively rapid consumption of the oxygen generated after termination of the charging of the battery. Thus, one of the aspects of my invention is the discovery that the battery should be designed to absorb oxygen at substantial rates, even though the battery system involved would seem not to require it because of the provision of means for discontinuing the charging of the battery as soon as the overcharge point is reached.

Another aspect of the invention is that I have found that by using a low impedance circuit between the negative battery plates and the oxygen consuming electrodes the oxygen consuming electrodes can have sufficient oxygen consuming capabilities to consume the excess oxygen in a relatively short period.

One particularly important application of the invention is in power systems for earth orbiting satellites where the rechargeable batteries involved are charged from solar cells which are alternately subjected to sunlight and darkness as the satellite traverses the sunlit and dark portions of the orbit. The batteries should be substantially fully charged by the solar cells during each period when the satellite is in sunlight. When the satellite is in darkness the batteries supply electric power to the electrical satellite equipment which substantially fully discharges the batteries during the dark period involved. It is of utmost importance that the batteries become substantially fully charged during the next sunlit period. This would not be readily possible if the oxygen consuming electrodes of the battery could not consume the aforesaid excess oxygen relatively rapidly so the resulting current flow drops below the trip level referred to so the battery can be recharged when the satellite next comes into sunlight. In this satellite application, the weight and size of the battery must be held to a minimum so my especially sensitive and efficient oxygen consuming electrodes are of particular utility in this and similar applications.

The above and other advantages, features and modes of operation of my invention will be disclosed in more detail in the specification to follow, and the drawings wherein:

FIG. 1 is a simplified diagram of a battery charge system to which my invention is applied;

FIG. 2 is a diagram illustrating the operation of the battery system of FIG. 1 to which my invention is applied when the battery charge system is utilized in a satellite where the batteries are charged from solar cells;

FIG. 3 is a vertical sectional view of a prismatic dry cell battery incorporating the most advantageous form of oxygen consuming electrodes to provide the most effective battery charge system;

FIG. 4 is a transverse sectional view of the battery of FIG. 3, taken substantially along the line 4—4 therein;

Figure 13:
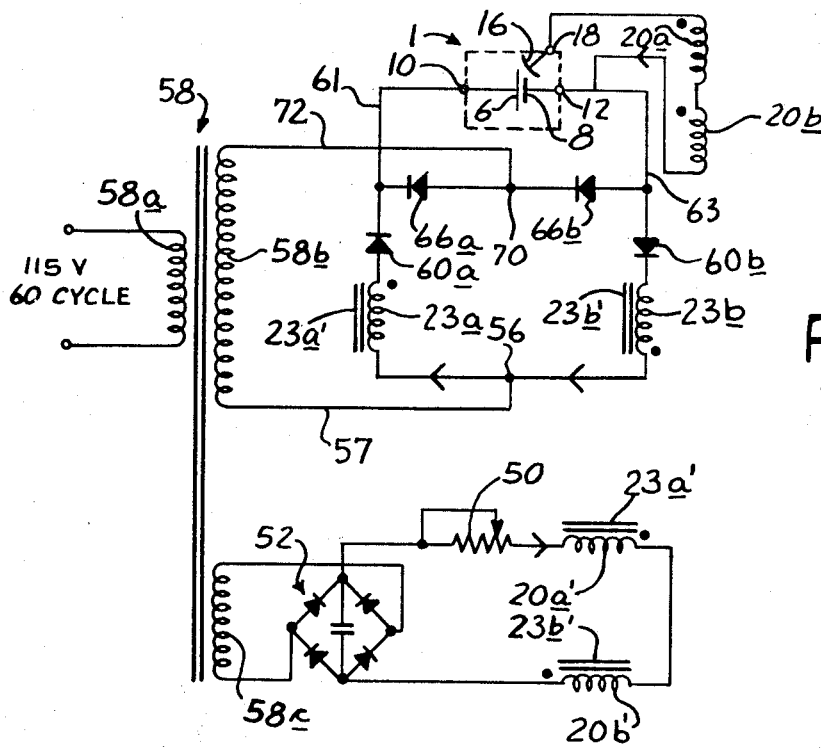
FIG. 13 is a circuit diagram of a magnetic amplifier controlled battery charge system incorporating the features of my invention.

In FIG. 1, a chargeable sealed battery is indicated by reference numeral 1 and includes a sealed casing in which two or more sets of positive and negative battery plates 6 and 8 are provided which are connected through conductors respectively the casing 4. The battery casing also includes one or more oxygen consuming electrodes 16 which, in the alkaline battery being described, is made of porous nickel or silver (preferably nickel) free of all materials except for a thin layer of electrolyte. The oxygen consuming electrodes 16 are connected to a terminal 18 on the outside of the casing which terminal is connected through conductor 19, current sensing means 20 and conductor 21 to the negative battery terminal 12. The electrolyte is preferably carried by absorbent layers 14 of an electrolyte absorbent material. Each electrode 16 is most advantageously separated from the battery plates by a short path of electrolyte absorbent material formed by a thin layer 14' of an electrolyte absorbent material. In such case, I have discovered that the electrodes 16 remain wet with a thin layer of electrolyte indefinitely (i.e. they do not dry out) because there is a short path between the electrodes 16 and a source of water generation at the positive plates during charging of the battery.

As previously indicated, the present invention has its most significant application in sealed nickel and silver-cadmium dry cell batteries. Where the battery is a nickel-cadmium battery, each completely discharged positive plate 6 would most preferably comprise divalent nickel or nickelous hydroxide [$Ni(OH)_2$] impregnated into a sintered porous nickel base plate. In silver-cadmium batteries, silver hydroxide is substituted for the nickelous hydroxide as the active material in the positive plates. The completely discharged negative plates 8 in nickel or silver-cadmium batteries each would most preferably be cadmium impregnated into a sintered porous nickel base plate. The electrolyte would most preferably be aqueous potassium hydroxide, such as a 30–34% solution of same.

In FIG. 1, the source of charging current for the battery 1 is identified by reference numeral 22, and where my invention is applied to an earth satellite, the charging current source would be solar cells which generate a charging voltage when subjected to sunlight.

When the positive and negative terminals 10–12 of the battery 1 are connected to the positive and negative terminals 22a and 22b of the charging current source 22 as the degree of charge of the battery reaches, say 20–80% of a fully charged condition, oxygen is generated at the positive battery plates by reaction (1) the rate of the reaction increasing as a fully charged condition and then an overchange condition is reached. Until the fully charged condition of the battery is reached, the main reaction taking place at the positive plates is the following:

(2) $\quad Ni(OH)_2 + OH^- \rightarrow NiOOH + H_2O + e^-$

During overcharge of the battery, water continues to be generated at the positive plates by the following reaction:

(3) $\quad 4OH^- \rightarrow 2H_2O + O_2 + 4e^-$

The oxygen generated at the positive plates migrates to the oxygen consuming electrodes where the following reaction takes place:

(4) $\quad 4H^0 + O_2 \rightarrow 2H_2O$ where the rate of the reaction is proportional to oxygen pressure. The maintenance of a supply of the hydrogen atoms shown in Equation 4 on the oxygen consuming electrodes 16 requires a source of electrons. These electrons are obtained from the negative battery plates during charging of the battery by the oxidation of cadmium thereat as follows:

(5) $\quad 2Cd + 4OH^- \rightarrow 2Cd(OH)_2 + 4e^-$

The water in the electrolyte supplies the hydrogen atoms and hydroxyl ions at the surface of each oxygen consuming electrode by means of a corrosion couple consisting of the Cd/Cd(OH)$_2$ of the negative plates in electrical contact with the nickel or silver of the oxygen consuming electrodes. Depicted electro-chemically the corrosion couple is:

$$\boxed{Ni/Cd,\ Cd(OH)_2/KOH(aq.),\ H\text{-}Ni}$$

where the connecting line indicates the spaced nickel or silver areas electrically connected through the electrolyte. The reaction of the corrosion couple is reaction (5) and the following:

(6) $\quad 4H_2O + 4e^- \rightarrow 4H^0 + 4OH^-$

Thus, when oxygen strips the surface of the oxygen consuming electrodes of hydrogen atoms, the reactions (5) and (6) then take place to supply new hydrogen atoms required by Equation 4 and the OH$^-$ ions required by Equation 5.

The electrons in Equation 5 must travel from the negative battery plates 8 through an external electrical circuit to the oxygen consuming electrodes 16 where they are consumed in reaction (6). As long as oxygen is present, the electrochemical reactions (4), (5) and (6) represent a dynamic rate process where the rate of electron flow (i.e. the current flow) in the current sensing means 20 in FIG. 1 will be proportional to oxygen pressure (i.e. the unconsumed oxygen) in the battery and is a measure of the degree of charge or overcharge of the battery.

It is believed that the ability of the above mentioned corrosion couple to produce hydrogen atoms by Equation 5, and hence absorb oxygen thereat is a function of the closeness of the voltage of the oxygen consuming electrode to that of the negative battery plates which is −0.8 volt in an alkaline cell with cadmium as the negative active material. I utilize this theory in the design of the charge system now to be described in detail.

The current sensing means 20 which, for example, may be a relay magnetic amplifier or transistors circuit, controls a charge control means 23 in the circuit between the charging current source 22 and the positive and negative battery terminals 10 and 12. The charge control means 23, may, for example, be a set of relay contacts, an electronic switch or a magnetic switch. The current sensing means 20 is designed to operate the charge control means to decouple or disconnect the charging current source 22 from the battery when the current flow between the negative battery plates 8 and the oxygen consuming electrodes 16 is at a level, referred to as the trip level, which represents the fully charged condition of the battery which, as previously indicated, is generally a current level well in excess of the current level at the beginning of oxygen generation.

When the battery is fully charged and a load device 24 is connected between the battery terminals 10 and 12, the battery will discharge. If oxygen generation would stop on discharge, as it would be expected to do, the current flow through the current sensing means 20 would start immediately to decrease as the oxygen consumption of the oxygen consuming electrode proceeds. The charge circuit of the battery then soon become operative again as the current dropped below the aforesaid trip level (or a somewhat lower trip level where a relay is utilized because the pull-in current of a relay is generally somewhat higher than the drop-out level). However, as previously indicated, I have discovered that oxygen generation surprisingly continues for a while after termination of a battery charge operation. This situation creates a problem which can be overcome in a number of possible ways, the most satisfactory of which is the limitation of the impedance of the current sensing means 20 presented between the negative battery plates 8 and the oxygen consuming electrodes 16.

To illustrate the aforesaid problem and my solution thereto, reference should be made to FIG. 2 which shows the variation in the current flow through the current sensing means 20 when the battery charged system thereshown is utilized in an earth orbiting satellite, where the charging current source 22 is one or more solar cells which operate to generate a voltage only when the satellite is subjected to sunlight. In FIG. 2, in the time interval between $T_0$ and $T_1$ the satellite passes through a sunlighted portion of its orbit. During the next time interval between $T_1$ and $T_2$, the satellite passes through a dark portion of its orbit, and during the subsequent interval between $T_2$ and $T_3$ the satellite again passes through a sunlighted portion of its orbit. It is assumed that the battery 1 begins to discharge when the satellite passes through a dark portion of its orbit where the solar cells 22 cannot supply current or voltage to operate the electrical equipment involved, and that the battery must be fully charged by the solar cells as the satellite passes through a sunlit portion of its orbit. It is also assumed that the current level $I_t$ indicated in FIG. 2 represents the current flowing in the current sensing means 20 which indicates a fully charged condition of the battery, that is a condition when all of the nickelous hydroxide of the negative battery plates of the exemplary battery which can be oxidized has been oxidized for the charge current involved and at which level it is desired to interrupt the charging of the battery. This is the "trip level" referred to previously.

It can be seen in FIG. 2 that in the time interval between $T_0$ and $T_a$ the current flowing through the current sensing means 20 slowly increases due to the very slow generation of oxygen during the non-critical portions of the charging cycle. However, at time $T_a$ the rate of oxygen generation and the current flow between the negative plates 8 and the oxygen consuming electrodes 18 suddenly increases, and at time $T_b$ the latter reaches the trip level $I_t$ where the current sensing means 20 operates the charge control means 23' which disconnects the solar cells 22 from the battery. Due to the presence of what I believe to be unstable oxides, oxygen actually continues to be generated at a high rate even after disconnection of the solar cells from the battery, and since the limited oxygen consuming electrodes cannot keep up with the continued high rate of oxygen generation, the oxygen pressure and the current flow in the current sensing means continues to increase for a while in the interval between times $T_b$ and $T_c$. A point is reached at the time $T_c$, however, when the rate of oxygen generation of the unstable oxides gradually tapers off to a point where oxygen consumption is greater than the oxygen generation. Then the current in the current sensing means 20 and the battery pressure starts to decrease gradually. A battery charging operation cannot resume until the current in the current sensing means 20 drops to the trip level $I_t$. The time it takes for the decay of this current to the trip level is determined by the ability of the oxygen consuming electrodes 16 to consume the oxygen remaining in the battery. As previously indicated, the oxygen consuming ability of the electrodes 16 is maximized in alkaline cadmium batteries by providing a voltage condition at the oxygen consuming electrodes which is as close to the ideal value of —0.8 volt as is possible which as previously indicated, is the voltage of the cadmium of the negative battery plates. This is achieved by minimizing the impedance of the current sensing means 20. The impedance value actually selected in a given case varies with the particular conditions of the battery load circuit and the particular current sensing means 20 desired. In most cases the impedance is small (like under ten ohms) where the voltage drop thereacross at the trip level is no more than about 30 to 40% of the voltage of the negative battery plates. In the embodiment now being described, the impedance should be such that the decay period of the oxygen consuming electrode current is sufficiently rapid that the current waveform in FIG. 2 goes below the trip level at time $T_d$ preferably before the start of the next period $T_2$ to $T_3$, when the satellite is in sunlight or in time to allow the battery to fully charge before the end of the sunlit period involved.

If the current sensing means 20 had a very large resistance value the voltage drop between the negative cadmium battery plates 8 and the oxygen consuming electrodes 16 is so great that the oxygen consuming electrodes is extremely poor. In such case, if the decay of the current in FIG. 2 starting at time $T_c$ followed the dashed curve 26, the current would not decay below the trip level $I_t$, until the time $T_e$ occurring during the next dark period beginning at time $T_3$. The entire sunlit period $T_2$–$T_3$ would then be unused for charging the battery 1 so the battery would be unable to supply adequate electrical power to operate the electrical equipment involved during the dark period beginning at time $T_3$.

Referring now to FIGS. 3 and 4 which illustrates a dry cell prismatic battery incorporating oxygen consuming electrodes 16 which are especially suitable for a battery charge system like that shown in FIG. 1. The casing 4 comprises an open top housing body 4a of generally rectangular configuration which may be made of insulating material or metal. The open top of the housing 4a is closed by a top wall 4b which is most advantageously made of insulating material. The top wall of the housing carries the positive terminal 10, the negative terminal 12 and the control terminal 18, which may be screw terminals to which the external circuits are suitably connected. The terminals 10, 12 and 18 have conductive portions 10' and 12' and 18' extending through and below the top wall 4b. The battery plates 6 and 8 have a generally rectangular configuration and are stacked in spaced parallel relation. The positive plates 6 have a series of connecting tabs 6a arranged in alignment and electrically connected in any suitable way to the positive terminal extension 10' as by suitable connector means 27 engaging all of the tabs 6a. The negative plates 8 have similar aligned tabs 8a which are connected by connector means 28 to the negative terminal extension 12'.

The positive and negative plates 6 and 8 alternate in position and the layers 14 of electrolyte impregnated separator material are sandwiched between the adjacent pairs of positive and negative plates. The separator layers may comprise a fibrous material, such as nylon, matted into a highly liquid absorbent body and may constitute a single length of separator material passing in zig-zag fashion between the various pairs of plates and around the sides thereof. The separator layers project a short distance beyond the normally top and bottom edges of the plates.

As illustrated, the oxygen consuming electrodes 16 form part of the stack of the positive and negative battery plates and are positioned in place of one or more negative battery plates in the usual prismatic battery so they are opposite a positive plate. As illustrated, the two outer negative battery plates are replaced by a pair of electrode assemblies 32—32 each comprising an outermost layer 33 of nylon netting or similar perforated insulating material, a central layer of porous nickel, silver, etc. constituting the oxygen consuming electrode 16, and an inner layer 14' of electrolyte absorbent material constituting a wick for the assembly. The oxygen consuming electrodes 16 of the electrode assemblies are interconnected by a suitable conductive link 34 which, in the illustrated form of the invention being described, has an inverted U shape with vertical arms 34a—34a and a connecting arm 34b. The connecting arm 34b is anchored in a suitable way, such as by a clamping screw 37, to the conductive portion 18' of the control terminal 18 extending through the upper wall 4b of the battery casing.

Figure 5:
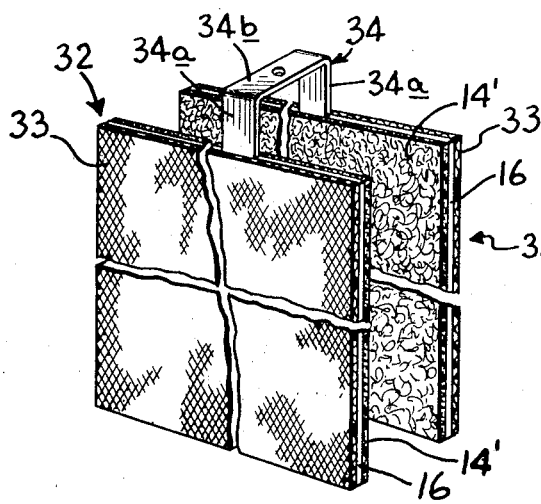
FIG. 5 is a perspective view of the oxygen consuming electrode structure forming part of the battery of FIGS. 3 and 4.
Figure 6:
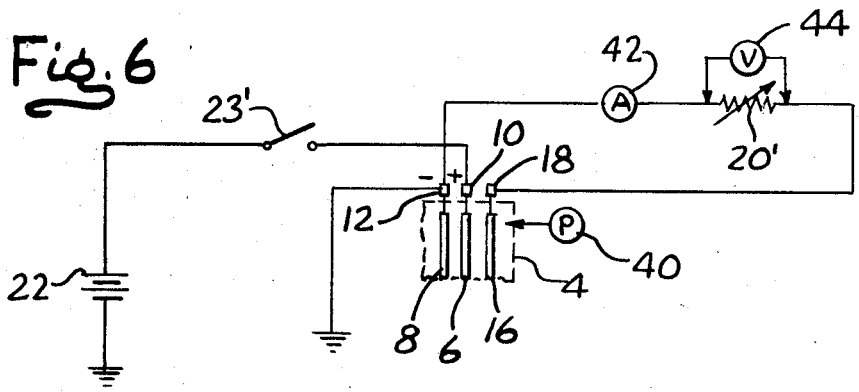
FIG. 6 is a diagram of the battery charge system of FIG. 1 for the batteries of FIGS. 3 and 4 where the circuit is provided with a variable impedance and pressure voltage and current measuring instruments to obtain the data illustrated by the characteristic curves shown in FIGS. 7 through 11.

To illustrate the importance of the value of the impedance of current sensing means 20, reference should be made to FIG. 6 wherein a battery like that shown in FIGS. 3 through 5 was incorporated in a circuit like that shown in FIG. 1, except the current sensing means 20 was replaced by a decade resistance unit 20', and the charge control means 23 was replaced by a manually operable switch 23'. Also, a pressuring measuring unit 40 was passed through a sealed opening in the casing 4 to measure pressure in the battery, an ammeter 42 was placed in series with the decade resistance unit 20' and a voltmeter 44 was connected across the decade resistance unit 20. The charging current remained constant throughout the charging operation. The resistance inserted into the circuit between the negative and the control terminals 12 and 18 by the decade resistance unit 20' was varied to obtain various measurements from which the curves of FIGS. 7 through 11 were prepared.

Figure 7:
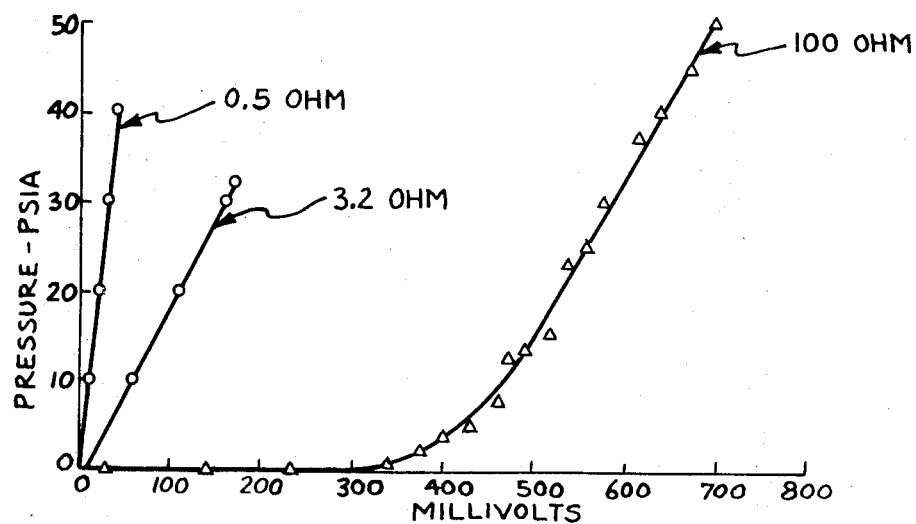

The curves of FIG. 7 represent various casing pressure and voltage measurements taken for three different resistance values of the decade resistance unit 20', namely, 0.5 ohm, 3.2 ohms and 100 ohms, when the switch 23' is closed. It should be noted that the voltage drop occurring across the resistance involved is quite substantial for the 100 ohms resistance, so that the voltage of the oxygen consuming electrodes 16 during most of the oxygen generation period was under —0.3 volt a voltage where the oxygen consuming ability of the oxygen consuming electrodes 16 is quite insignificant. On the other hand, the voltage drop across the decade resistance unit 20' for a 3.2 ohms resistance is quite modest so that the voltage of the oxygen consuming electrodes stays between —0.6 of a volt to —0.8 of a volt. In the case of the 0.5 ohm resistance, the voltage drop across this resistance is negligible, so that the voltage oxygen consuming electrode 16 is operating near its maximum oxygen consuming efficiency for the temperature conditions of the battery involved.

Figure 8:
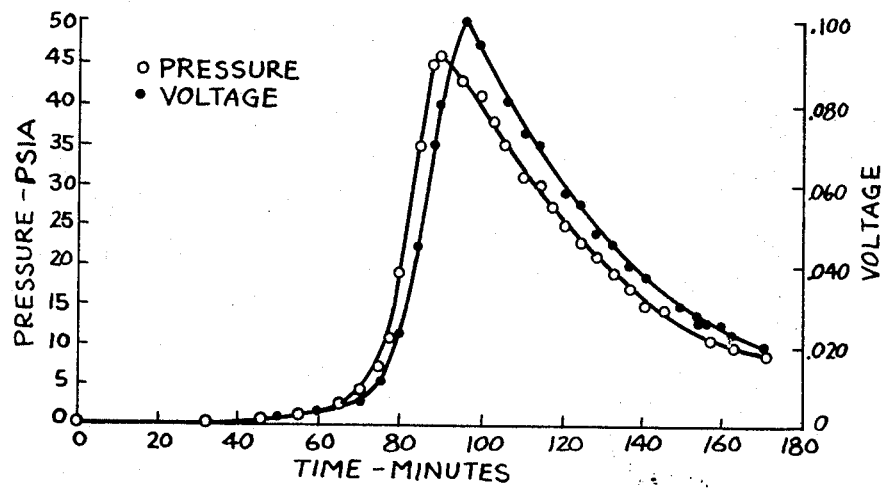
Figure 9:
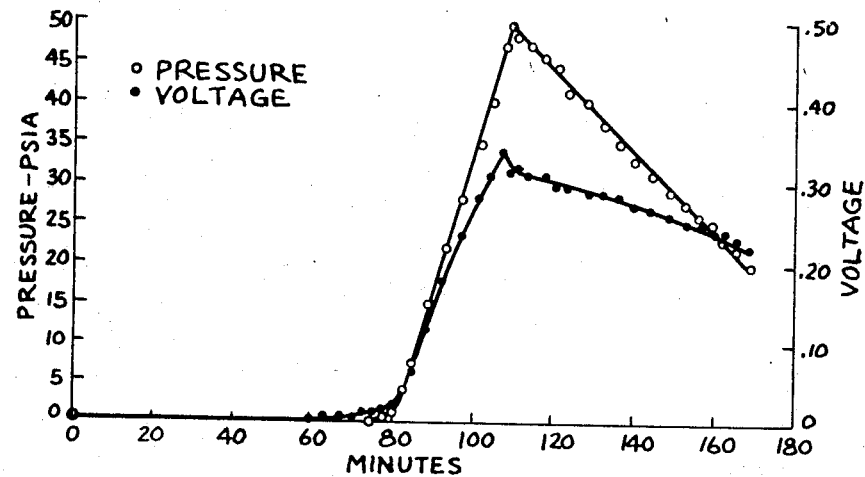
Figure 10:
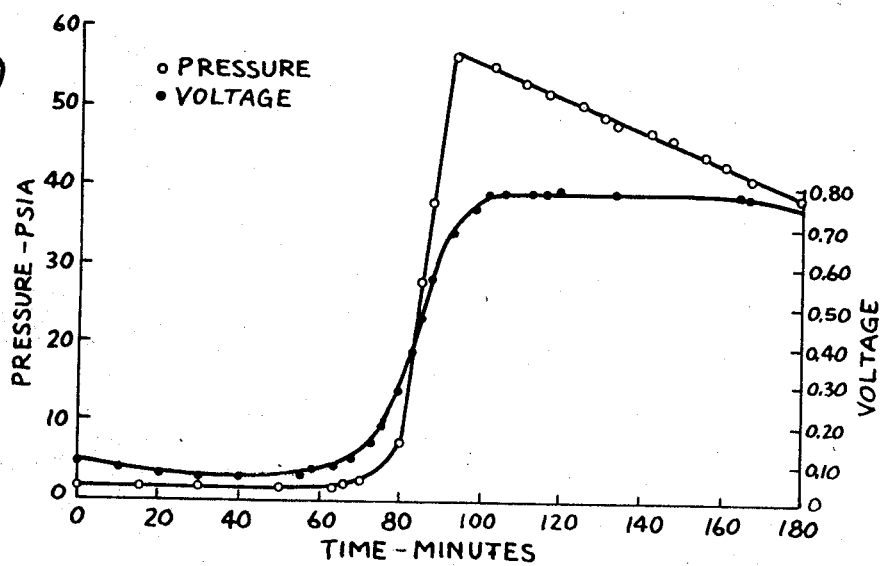

FIGS. 8 through 10 illustrate the variations in the casing pressure and voltage drop across the decade resistance unit 20' with time under the conditions when the battery 1 is first charged and then overcharged at a constant current of 3 amps and then under the conditions where the charging current source 22 is disconnected from the battery whereupon, after a short delay as previously indicated, oxygen pressure and current between the negative battery plates and the oxygen consuming electrodes decay as the oxygen is gradually consumed primarily by the oxygen consuming electrodes 16. (It is apparent that the variation in current flow between the negative battery plates and the oxygen consuming electrodes is represented by the voltage curves in FIGS. 8 through 10.) It is apparent from these curves that the smaller the value of the resistance connected between the negative battery plates 8 and the oxygen consuming electrodes, the faster the decay of battery pressure and the voltage and current conditions of the decade resistance unit 20'. Also, when a 100 ohm resistor is used (see FIG. 10), the decay of the current and voltage conditions of the decade resistance unit 20' is so insignificant, that it takes a great many hours for the current flow between the negative battery plates and the oxygen consuming electrodes 16 to drop to below the aforementioned trip level in a battery charge system like that described in connection with FIG. 1.

Figure 11:
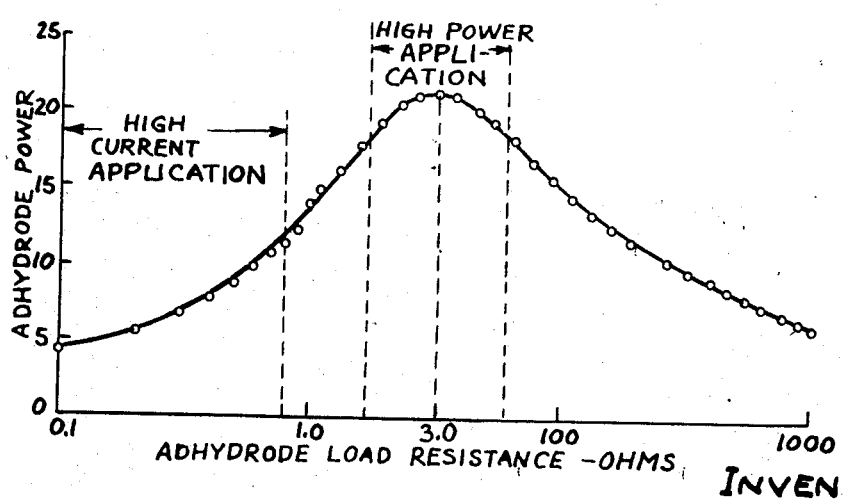

The curve of FIG. 11 was drawn under conditions where the resistance of the decade resistance unit 20' was varied between 0.1 ohm and the 100 ohms. The decade resistance unit 20' was first set at 1.0 ohm until the pressure in the battery was stabilized. Then the resistance was decreased in increments of 0.1 ohm and the voltage read without delay. After reaching 0.1 ohm, the resistance of the decade resistance unit 20' was increased so that the duplicate readings at 0.3, 0.6 and 1.0 ohm were taken. The resistance was then increased in increments to 100 ohms. The battery was charged under low current conditions where the temperature of the battery was at ambient temperature so the battery pressure was essenially constant throughout the measurements taken. FIG. 11 shows that maximum power is delivered to the load constituted by the decade resistance decade unit 20' for a resistance of three ohms. Thus, when the current sensing means 20 in FIG. 1 is a device like a relay where it is desired to deliver maximum power thereto for a given pressure within the battery, the coil of the relay is preferably wound so that it has a resistance of three ohms for the particular battery for which the curves of FIGS. 7 through 11 apply. On the other hand, for resistance values under one ohm, the circuit of FIG. 1 operates best when the current sensing means 20 is a high current operating device like a magnetic switch device.

Figure 12:
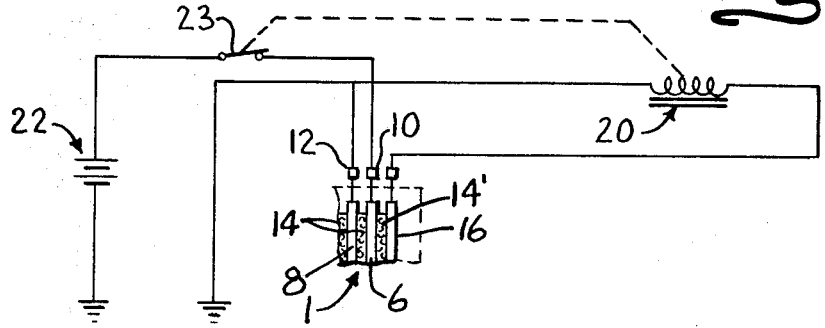
FIG. 12 is a relay controlled battery charge system incorporating the features of my invention.

FIGS. 12 and 13 illustrate two exemplary battery charging circuits where the current sensing means 20 in FIG. 1 respectively are relay and magnetic switch circuits. Thus, in FIG. 12, the current sensing means 20 is a relay coil which most desirably has a resistance of three ohms for the particular exemplary battery described above. (A three ohm relay coil is an unusually low resistance for a relay coil so it would be a special custom made relay coil.) The charge control means 23 is a set of normally closed contacts operated by relay coil 20. The relay coil would be designed to be energized to open the contacts 23 when a current in excess of 50 ma. flows in the relay coil which indicates a fully charged condition of the battery 1 described above for a load resistance of three ohms (the current for a fully charged condition of the battery varies with the load resistance).

It will be recalled that the trip level $I_t$ represents a current flow through the current sensing means 20 corresponding to a substantially fully charged condition of the battery. There is manifestly a range of current flow above a given minimum current level which satisfies this condition. Current levels above this minimum level represent an overcharged condition of the battery which is permissible if the battery casing can withstand the resulting pressure and temperature conditions involved. One method for determining a suitable trip level for a given battery is an empirical one. Thus, charge efficiencies for sealed cadmium batteries of the type being described commonly fall in the range of from 90 to 97%. The battery involved is placed into the circuit to be used in the field, and the battery is discharged to a given level at a constant current and a notation is made of the length of the discharge period so that the ampere hours involved in the discharge can be computed. Then, the battery is charged at the desired constant high charge rate and for a period where the ampere hours of charge are sufficiently great, considering the minimum expected charge efficiency that the battery is in an insignificant overcharged condition. A notation is then made of the current flow through the current sensing means 20 when the battery is in such an overcharged condition.

Refer now to FIG. 12 which shows a battery charge control system where the current sensing means 20 is a pair of magnetic switches including a pair of control windings 20a and 20b connected in series between the negative terminal 12 and the control terminal 18 of the battery 1. The control windings are respectively individually coupled to associated gate windings 23a and 23b constituting the aforementioned charge control means 23 by being wound on respective cores 23a' and 23b' made of ferrite or similar magnetic material having a rectangular hysteresis characteristic. Wound on the cores 23a' and 23b' are biasing windings 20a' and 20b' which are connected in series with a variable reactance like a rheostat 50 and the output terminals of a conventional full wave rectifier circuit 52 which provides a flow of direct current through the biasing windings 20a' and 20b'. The rheostat is initially adjusted so that the current flow in the biasing windings 20a' and 20b' will saturate the magnetic cores 23a' and 23b' when no current is flowing in the control windings.

The lead windings 23a and 23b are connected to a common terminal 56 connected by a condutcor 47 to the bottom end of a secondary winding 58b of a power transformer 58. The transformer 58 has a primary winding 58a connected to a suitable source of commercial alternating current. The aforementioned full wave rectifier circuit 52 is fed from a secondary winding 58c wound on the same core as the secondary winding 58b.

The voltage appearing at the bottom end of the secondary winding 58b is coupled through the load windings 23a and 23b of the magnetic switches 20 to a full wave rectifier circuit including rectifiers 60a and 60b respectively connected to the remote terminals of the load windings 23a and 23b, the anode of the rectifier 60a being connected to the load winding 23a and the cathode of the rectifier 60b being connected to the load winding 23b. The cathode of rectifier 60a is coupled by a conductor 61 to the positive terminal 10 of the battery 1 and the anode of rectifier 60b is connected by a conductor 63 to the negative terminal 12 of the battery 1.

A pair of rectifiers 66a and 66b are respectively coupled between a common terminal 70, connected by a conductor 72 to the upper end of the winding 58b, and the conductors 61 and 63, respectively, the cathode of rectifier 66a being connected to the conductor 61 and the anode of the rectifier 66b being connected to the conductor 63. With the arrangement of the rectifiers described, for the first half cycle of each cycle of operation of the system, current will flow from the upper end of the transformer winding 58b, through the rectifier 66a, the conductor 61 extending to the positive battery terminal 10, the negative battery terminal 12, rectifier 60b and the load winding 23b of one of the magnetic switches, the common terminal 56 and conductor 57 extending to the bottom end of the secondary winding 58b. As long as the core 23b' is saturated, the reactance of winding 23b is negligible and maximum charging current will flow during each first half cycle. In each second half cycle, current will flow from the bottom terminal of the secondary winding 58b through the load winding 23a, rectifier 60a, conductor 61, positive battery terminal 10, negative battery terminal 12, conductor 63, rectifier 66b and conductor 72 leading to the upper end of the secondary winding 58b. Again, as long as the core 23a' is saturated, the reactance of the load winding 23a is so low that maximum current will flow in this circuit. (The aforesaid maximum current will be assumed to provide a high charge rate for the battery 1.)

The control windings 20a and 20b are so wound with respect to the biasing windings 20a' and 20b' that, when current flows in the control windings 20a and 20b as a result of the flow of electrons between the negative battery plates 8 and the oxygen consuming electrodes 16 indicating the fully charged condition of the battery 1, the magnetomotive forces generated by this current in the cores 23a' and 23b' will oppose the magnetomotive forces generated therein by the current flow in the biasing windings so that the cores become unsaturated. When the cores 23a' and 23b' become unsaturated, the reactance of the load windings 20a and 23a will be so great that the current flow in the circuit involved is reduced to such a low level that oxygen generation within the battery 1 thereafter will be negligible until the current flow through the control windings 20a and 20b reduces below the trip level referred to, to permit the high rate charging of the battery 1 once again.

It should be understood that numerous modifications may be made in the preferred forms of the invention described above without deviating from the broader aspects of the invention.

In the claims, the expression "oxygen generation responsive means" is intended to include any and all elements which react to the generation of oxygen within the battery casing, directly or indirectly. For example, the oxygen generation responsive means may include the current sensing means 20 in FIG. 1 and electrodes within the casing 4.

I claim:

1. In combination, a sealed battery capable of being repeatedly charged and discharged, said battery including a sealed casing having exposed negative and positive terminals and an exposed control terminal, positive and negative battery plates within said casing and electrically connected respectively to said positive and negative terminals, and an electrolyte within said casing forming with said positive and negative battery plates a rechargeable electrochemical system which generates oxygen at least during the overcharge of the battery, said battery during the high rate charging of the battery generating a progressively increasing amount of unconsumed oxygen which progressively builds up the pressure within the sealed battery casing (a) as the fully charged condition of the battery is approached (b) during overcharge thereof and (c) for a while following the subsequent interruption of the charging thereof; charge control means for normally feeding charging current to said positive and negative terminals for charging the battery at a relatively high rate; means responsive to the generation of oxygen within the battery casing indicating a substantially fully charged condition of the battery by effecting the operation of said charge control means to terminate the feeding of said charging current to said positive and negative terminals and for effecting the rapid consumption of oxygen in said battery casing after the termination of the feeding of said charging current to said positive and negative terminals of the battery, the last mentioned means including porous oxygen consuming electrode means within said casing electrically connected to said control terminal, and current responsive means connected between said negative and control terminals of the battery, the porous oxygen consuming electrode means effecting consumption of only a part of the oxygen generation during the charging of the battery, said oxygen consumption resulting in the flow of current through said current responsive means connected between said negative and control terminals of the battery, the value of which current progressively increases with the amount of unconsumed oxygen and the consequent build-up of pressure in the casing, and said current responsive means being responsive to the flow of current between the control and negative terminals at a given trip level representing a desired fully charged condition of the battery by operating said charge control means to terminate the high rate charging of the battery, the oxygen consuming electrode means consuming the unconsumed oxygen at a relatively fast rate to bring said current flow between said negative battery plates and said oxygen consuming electrode means relatively rapidly below said trip level to enable the battery to be recharged again; and an intermittently operated load device connected to said positive and negative terminals which load device discharges the battery over a given operating period to a point where the load device is not then fully operative for its intended purpose, there being a permissible shutdown minimum interval during which the load device is not normally expected to be operated after the termination of each operation thereof; said resultant impedance of said current responsive means between said negative and control terminals of the battery being so low that the rate of decay of the current flowing through said current responsive means between said negative and control terminals of the battery being so low that the rate of decay of the current flowing through said current responsive means following cessation of oxygen generation subsequent to termination of the charging of the battery is sufficiently fast that it will drop to said trip point before the end of any shutdown period of the load device where the battery can be fully recharged before the end of the end of the shutdown period involved.

2. In combination: (a) a sealed battery capable of being repeatedly charged and discharged and including a sealed casing having exposed negative and positive terminals and a control terminal, positive and negative battery plates within said casing and connected respectively to said positive and negative terminals, and an electrolyte within said casing forming with said positive and negative battery plates a rechargeable electro-chemical system which, during the high rate charging of the battery, generates progressively increasing amounts of unconsumed oxygen which progressively builds up the pressure within the sealed battery casing as the fully charged condition of the battery is approached during overcharge thereof and, in the absence of effective oxygen consuming means, also for a while following the subsequent interruption of the charging thereof, porous oxygen consuming electrode means within the casing electrically connected to said control terminal and when electrically connected to the negative terminal of the battery through a circuit connected between said negative and control terminals of the battery effects oxygen consumption of only a part of the oxygen which would be generated during the overcharge of the battery if the charge thereof would not be interrupted and to a degree which increases with the similarity of the voltage between the oxygen consuming electrode means and the negative battery plates, said oxygen consumption resulting in the flow of current in said circuit between said negative and control terminals of the battery, the value of such current progressively increasing with the amount of unconsumed oxygen and the consequent build-up of pressure in the casing; (b) a charge circuit for the battery comprising a source of undirectional charging current having positive and negative terminals, and a circuit respectively connecting the positive and negative terminals of said source of charging current respectively to the positive and negative terminals of the battery which source produces said high rate charging of the battery, said charge circuit including control means for interrupting the flow of said charge current to the battery; (c) an intermittently operated load device across the positive and negative battery terminals whcih device discharges the battery to a point where the load device is not operated for its intended purpose when said source of charging current is disconnected from the battery, there being a minimum permissible shutdown interval during which the load device is not normally expected to be operated after the termination of each operation; (d) and a control circuit for said control means comprising current responsive means connected between said negative and control terminals of said battery and responsive to the flow of current between the latter terminals at a given trip level representing a desired fully charged condition of the battery plates by operating said control means to discontinue the high rate charging of the battery, said oxygen consuming electrode means within the battery following cessation of the oxygen generation consuming the oxygen in the battery at a sufficiently rapid rate that the current flowing through said current responsive means subsequent to termination of the charging of the battery will drop below said trip level sufficiently before the end of the next shutdown period of the load device that the battery can be substantially fully charged by the end of said shutdown period involved.

3. In combination: (a) a sealed battery capable of being repeatedly charged and discharged and including a sealed casing having exposed negative and positive terminals and a control terminal, positive and negative battery plates within said casing and electrically connected respectively to said positive and negative terminals, and an electrolyte within said casing forming with said positive and negative battery plates a rechargeable electro-chemical system which, during the high rate charging of the battery, generates a progressively increasing amount of unconsumed oxygen which progressively builds up the pressure within the sealed battery casing as the fully charged condition of the battery is approached, during overcharge thereof and also for a while following the subsequent interruption of the charging thereof, and porous oxygen consuming electrode means within the casing electrically connected to said control terminal and when electrically connected to the negative terminal of the battery through a circuit connected between said negative terminal and control terminal of the battery effects oxygen consumption of only a small part of the oxygen generated during the charge and overcharge of the battery and to a degree which increases with the similarity of the voltage between the oxygen consuming electrode means and the negative battery plates, said oxygen consumption resulting in the flow of current in said circuit between said negative and control terminals of the battery, the value of which progressively increases with the amount of unconsumed oxygen and the consequent build-up of pressure in the casing; (b) a charge circuit for the battery comprising a source of undirectional charging current having positive and negative terminals and circuit means connecting the positive and negative terminals of said source of charging current respectively to the positive and negative terminals of the battery to produce said high rate charging of the battery, said current circuit means including control means for interrupting the flow of said charge current to the battery; and (c) a control circuit for said control means comprising current responsive means connected between said negative terminal and control terminal of said battery and responsive to the flow of current between the latter terminals at a given trip level representing a desired fully charged condition of the battery by operating said control means to terminate said high rate charging of the battery, said current responsive means providing a resultant impedance between said negative terminal and control terminal of the battery which is so low that the voltage drop thereacross during said current flow therethrough is only a small fraction of the voltage of the negative battery plates, to keep the voltage of the oxygen consuming electrode means near that of the negative battery plates where, following discontinuance of the high rate charging of the battery and the subsequent cessation of oxygen generation, the oxygen consuming electrode means consumes the unconsumed oxygen at a relatively fast rate to bring said current flow between said negative battery plates and said oxygen consuming electrode means relatively rapidly below said trip level to enable the battery to be recharged again.

4. A battery system comprising: a sealed battery capable of being repeatedly charged and discharged, said battery including a sealed casing having exposed negative and positive terminals and an exposed control terminal, positive and negative battery plates within said casing and electrically connected respectively to said positive and negative terminals, and an electrolyte within said casing forming with said positive and negative battery plates a rechargeable electro-chemical system which generates oxygen at least during the overcharge of the battery, said battery during the high rate charging of the battery generating a progressively increasing amount of unconsumed oxygen which progressively builds up the pressure within the said battery casing (a) as the fully charged condition of the battery is approached (b) during overcharge thereof and (c) for a while following the subsequent interruption of the charging thereof; charge control means for normally feeding charging current to said positive and negative terminals for charging the battery at a relatively high rate; and means responsive to the generation of oxygen within the battery casing indicating substantially fully charged condition of the battery by effecting the operation of said charge control means to terminate the feeding if said charging current to said positive and negative terminals and for effecting the rapid consumption of oxygen in said battery casing after the termination of the feeding of said charging current to said positive and negative terminals of the battery, oxygen consuming electrode means within said casing electrically connected to said control terminal, and current responsive means connected between said negative and control terminals of the battery, the porous oxygen consuming electrode means effecting consumption of only a part of the oxygen generation during the charging of the battery and to a degree which increases with the similarity of the voltage between the oxygen consuming electrode means and the negative battery plates, said oxygen consumption resulting in the flow of current through said current responsive means connected between said negative and control terminals of the battery, the value of which current progressively increases with the amount of unconsumed oxygen and the consequent build-up of pressure in the casing, and said current responsive means being responsive to the flow of current between the control and negative terminals at a given trip level representing a desired fully charged condition of the battery by operating said charge control means to terminate the high rate charging of the battery; the resultant impedance of said current responsive means between said negative and control terminals of the battery being less than 10 ohms so the voltage drop thereacross during said current flow therethrough is only a small fraction of the voltage of the negative battery plates, to keep the voltage of the oxygen consuming electrode means near that of the negative battery plates where, following discontinuance of the high rate charging of the battery and the subsequent cessation of oxygen generation, the oxygen consuming electrode means consumes the unconsumed oxygen at a relatively fast rate to bring said current flow between said negative battery plates and said oxygen consuming electrode means relatively rapidly below said trip level to enable the battery to be recharged again.

References Cited

UNITED STATES PATENTS

| 2,578,027 | 12/1951 | Tichenor | 320—46 |
| 3,005,943 | 10/1961 | Jaffe | 320—46 X |
| 3,009,981 | 11/1961 | Wildi et al. | 320—2 X |
| 3,080,440 | 3/1963 | Ruetschi et al. | 136—3 |
| 3,096,215 | 7/1963 | Voss et al. | 136—6 |
| 3,348,118 | 10/1967 | Watrous | 320—40 |

JOHN F. COUCH, Primary Examiner

S. WEINBERG, Assistant Examiner

U.S. Cl. X.R.

136—3; 320—40, 46